D. GRANT.
BEESWAX CLEANER.
APPLICATION FILED JULY 26, 1911.
1,023,640.
Patented Apr. 16, 1912.
2 SHEETS—SHEET 2.
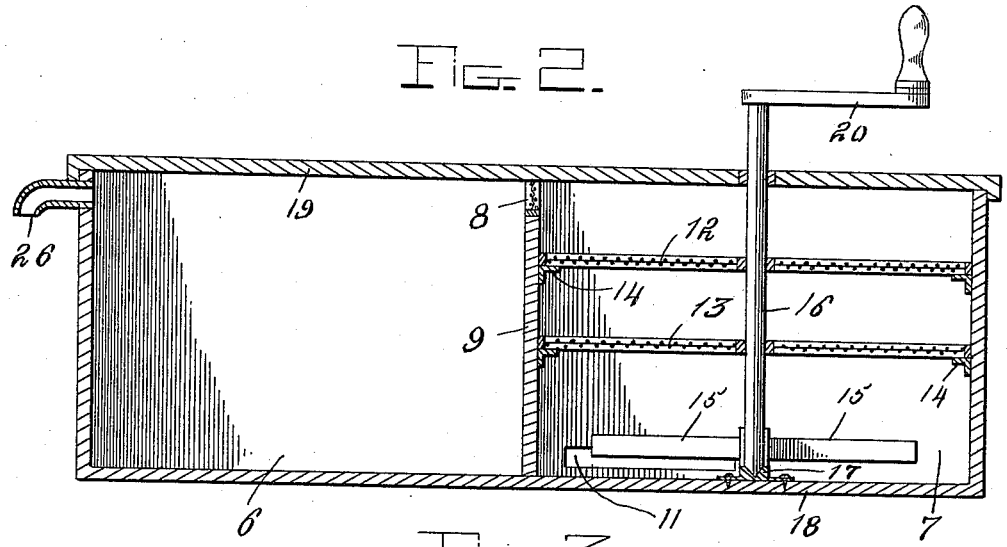
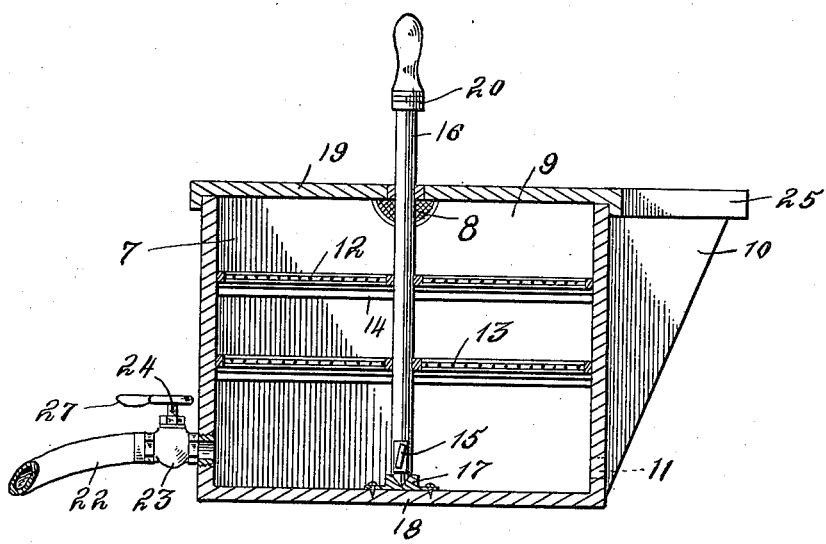
Witnesses
Alan T. Garner,
John A. Donegay.
Inventor
Daniel Grant
By Victor J. Evans
Attorney

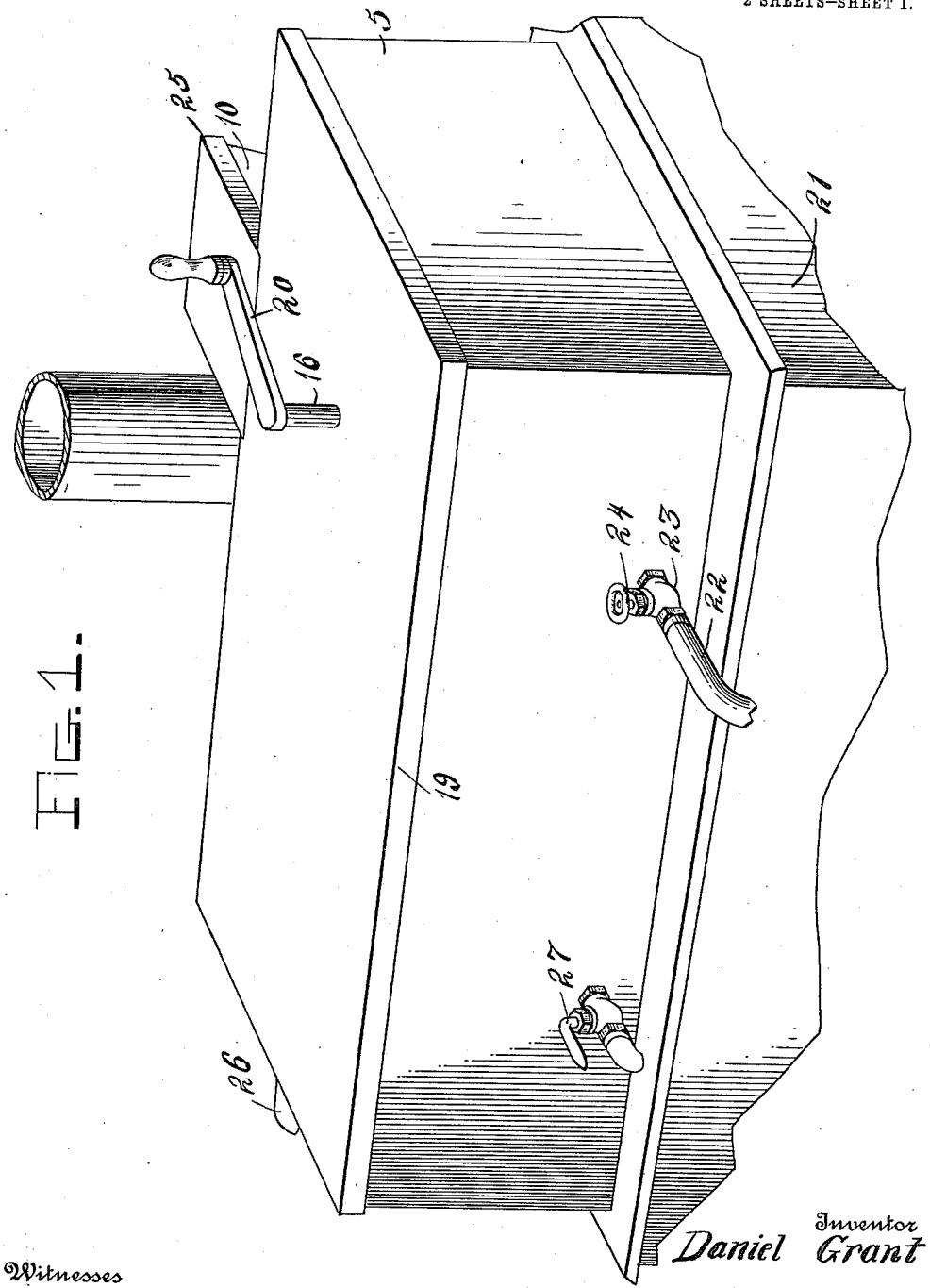

UNITED STATES PATENT OFFICE.

DANIEL GRANT, OF SAN JACINTO, CALIFORNIA.

BEESWAX-CLEANER.

1,023,640.  Specification of Letters Patent.  Patented Apr. 16, 1912.

Application filed July 26, 1911. Serial No. 640,560.

*To all whom it may concern:*

Be it known that I, DANIEL GRANT, a citizen of the United States, residing at San Jacinto, in the county of Riverside and State of California, have invented new and useful Improvements in Beeswax - Cleaners, of which the following is a specification.

The general objects of the invention are to facilitate the operation of cleaning beeswax; and to reduce to a minimum, the time heretofore required to perform this operation.

Other objects will appear and be better understood from the following description taken in connection with the accompanying drawings, in which, Figure 1 is a perspective of the device in operative position. Fig. 2 is a vertical longitudinal section of the same. Fig. 3 is a vertical cross section.

The receptacle 5 has chambers 6 and 7 which communicate through a screen covered opening 8 in the upper end of the partition 9 which divides the interior of the receptacle. The mass which is made up of wax, honeycomb and foreign matter such as dead bees, etc., is introduced into the chamber 7 through a hopper 10 which communicates with the chamber 7 through an opening 11 formed in a wall of the chamber 7 and below the removable screens 12 and 13 which are arranged in spaced relation and supported by the strips 14 herein shown as secured to the partition 9 and one of the outer walls of the chamber 7. The mass is broken up and stirred by means of an agitator, herein shown to comprise a pair of oblique lathes 15 connected to a shaft 16 which is stepped into a socket 17 on the bottom 18 of the receptacle, the said shaft having bearings in the screens 12 and 13 and extending through the cover 19 of the receptacle and turned by means of a crank handle 20.

In use the receptacle is arranged so that the chamber 7 thereof, will overlie the fire chamber of a suitable heater, such as shown in Fig. 1 and designated by the numeral 21. Connection between the chamber 7 and with a water main or other suitable source of water supply, (not shown) is established by means of a pipe line 22, one end of which connects with a valve casing 23 carried by one of the outer walls of the chamber 7, the valve 24 of which controls the supply of water to the chamber 7.

In use, the chamber 7 is preferably filled to a point above the screens and to the screen covered opening 8. The chamber 6, at the beginning of the operation, is only partially filled with water. The temperature of the water in the chamber 7 is raised sufficiently high to dissolve the wax in the mass which, as before stated, is introduced into the chamber through the hopper 10. The breaking up of the mass is accelerated by the agitator 15 which is turned by means of the crank handle 20. The wax, as it is liberated from the mass, rises through the screens 12 and 13 and passes through the screen covered opening 8 into the chamber 6 where the water is much cooler than in the chamber 7, thus permitting the wax to form in lumps on the surface of the water, in the chamber 6. It will be understood that during this operation, the receptacle is sealed by the cover 19 therefor, so also is the hopper sealed by the cover 25. At intervals during the cleaning operation, fresh water is introduced into the chamber 7 by opening the valve 24 in order to compensate for the water which flows with the wax through the screen covered opening 8, thus maintaining the water in the receptacle 7 to a point even with the lower side of the opening 8. As the water in the chamber 6 rises with the wax floating thereon, it flows through an outlet pipe 26 in the upper end of the chamber 6 into a suitable receptacle (not shown) where the wax is removed from the water by skimming. When it is desired to keep the wax in the chamber 6 throughout the cleaning operation, the valve 27 may be opened so as to permit an amount of water to escape from the chamber 6 equal to that which is introduced at different intervals into the chamber 7. It will be understood that the meshes of the various screens will be sufficiently small to prevent the passage of particles of comb or other foreign matter therethrough so that when the wax enters the chamber 6 it will be perfectly clean.

Although I have shown and described one embodiment of my invention it is to be understood that I am not to be limited to the specific description and arrangement of the parts herein shown and claimed, since various changes will be made within the scope of the appended claim without departing from the spirit or sacrificing any of the advantages of the invention.

What I claim as new is:

In a device for cleaning beeswax, a receptacle adapted to be arranged upon a heater and interiorly divided by a vertical wall into a chamber for the wax to be cleaned, and a chamber for the cleaned wax which communicates with the first-named chamber through a screen covered opening in the upper portion of the side wall, a plurality of removable screens arranged one above the other in the first-named chamber, an agitator located below the screens and having a shaft journaled in the screens and in the bottom of the receptacle, a feed hopper and an inlet tube communicating with the space below the screens, and an outlet tube extending from the upper portion of the second-named chamber.

In testimony whereof I affix my signature in presence of two witnesses.

DANIEL GRANT.

Witnesses:
JIM M. BLACKMORE,
VICTOR E. PROCTOR.

Copies of this patent may be obtained for five cents each, by addressing the "Commissioner of Patents, Washington, D. C."